Feb. 2, 1932.   L. E. MILLS   1,843,693
MANUFACTURE OF AMINE SALTS
Filed Sept. 14, 1929
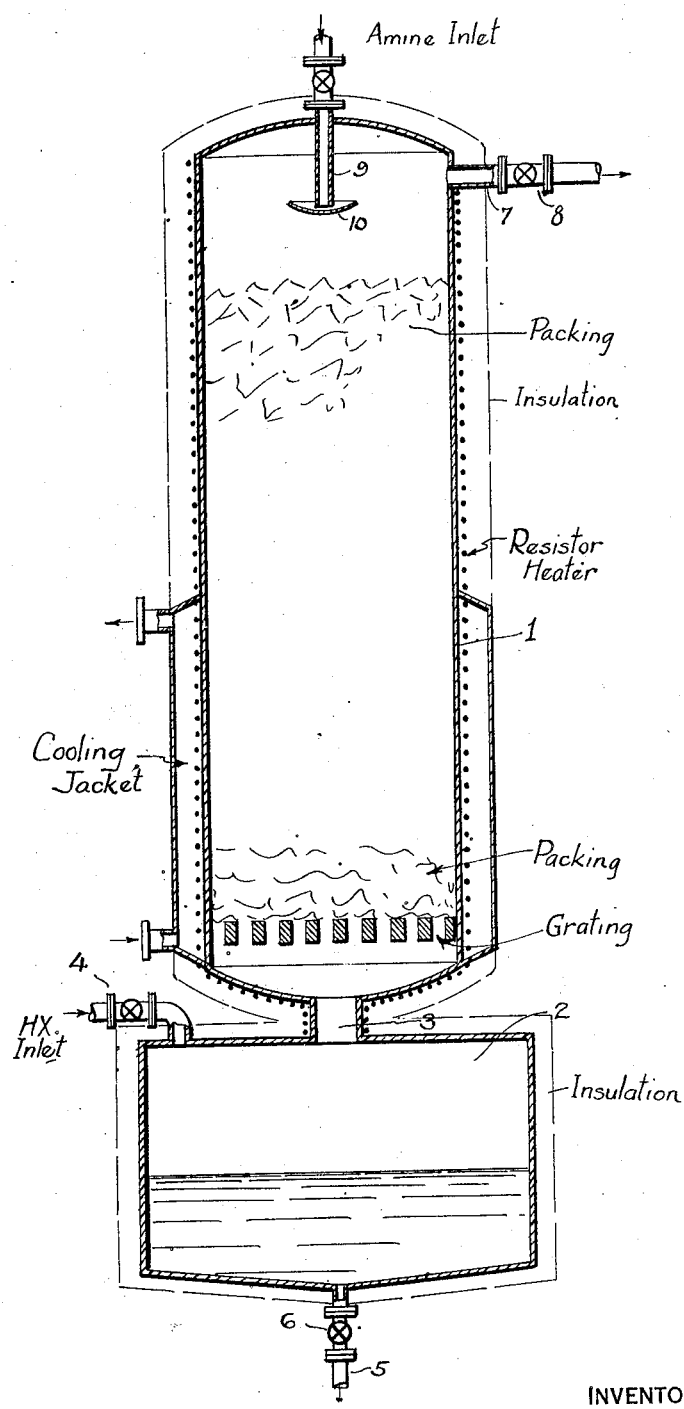
INVENTOR
BY Lindley E. Mills
Thomas Griswold Jr.
ATTORNEY Patented Feb. 2, 1932

1,843,693

UNITED STATES PATENT OFFICE

LINDLEY E. MILLS, OF MIDLAND, MICHIGAN, ASSIGNOR TO THE DOW CHEMICAL COMPANY

MANUFACTURE OF AMINE SALTS

Application filed September 14, 1929. Serial No. 392,726.

The present invention relates to the manufacture of amine salts, particularly aromatic amine hydrohalides, and more particularly to methods for the manufacture of aniline hydrochloride.

Hitherto, aniline hydrochloride usually has been prepared industrially in aqueous solution by dissolving aniline in concentrated aqueous hydrochloric acid and crystallizing said aniline hydrochloride therefrom. Since the latter is soluble in water, it is necessary to concentrate the mother liquors repeatedly in order to crystallize more product therefrom. The material from each crystallization is separated and dried. Aniline hydrochloride prepared in this manner is usually discolored or becomes so upon standing a short time. Decolorization may be resorted to, e. g. by addition of a material such as stannous chloride to the aqueous aniline hydrochloride solution before the crystallization steps, but such decolorization thus adds a metal salt impurity to the solution.

Methods for the laboratory preparation of amine hydrohalides employing non-aqueous solvents are well known. For instance, Hoffmann (Lassar Cohn; Arbeits Methoden, 4th ed., 1907, spl. part, pg. 127: Leopold Voss Pub.) obtained crystals of ethyl aniline hydrochloride by passing gaseous hydrogen chloride into an ether solution of the free amine. Ullmann (Ber. 31—1699; 1898) prepared the hydrochlorides of aniline, the toluidines, and xylidines, by conducting the said gaseous acid into carbon tetrachloride solutions of the respective amines. Lassar Cohn (loc. cit.) has stated that in all such cases, ether can be replaced by benzene, etc.

I have now discovered a new and improved method wherein amine hydrohalides may be prepared in the absence of a solvent or diluent, by direct reaction between the base in liquid form and a gaseous hydrogen halide, whereby such products are obtained directly in the liquid state, previously to solidification. By conducting the process in such manner, a pure, white, crystalline product is obtained with the minimum number of operating steps, hence at a lower cost. Moreover, use of a solvent or diluting medium is eliminated, thus the several above-mentioned concentration, crystallization, separation and drying steps are likewise eliminated. Other objects and advantages will become apparent as the description proceeds.

To the accomplishment of the foregoing and related ends, the invention, then, consists of the method and means hereinafter fully described and particularly pointed out in the claims, the following description setting forth in detail certain means and modes of carrying out the invention, such disclosed modes illustrating, however, but several of various ways in which the principle of the invention may be used.

In said annexed drawing:—

The single figure there appearing illustrates diagrammatically one form of apparatus suitable for carrying out my new and improved process.

Referring to the drawing, 1 is a vertical column or tower, provided with a heating means shown as an externally wound electric resistor wire, the column being filled with packing material to furnish extensive contacting surface such as plates, beads, rings, jacks and the like, and connected at the lower end to receiver 2 and by constriction or passage 3. To said receiver 2, there is attached a valved inlet pipe 4 for gaseous acid and an outlet pipe 5 for the product which is provided with a valve 6. To the upper end of tower 1, there is attached an exit pipe 7, provided with a valve 8, and an inlet pipe 9 for the amine at the lower end of which is a small dish shaped receptacle 10 or equivalent means adapted to spread the amine over packing in tower 1.

By way of illustration, the new and improved procedure will hereinafter be described as applied to the manufacture of aniline hydrochloride.

The above described apparatus is first swept practically free of air with dry, substantially air free hydrogen chloride gas, the latter entering said apparatus by inlet pipe 4 and leaving by exit pipe 7. Valve 8 is then closed, and said acid gas maintained within the apparatus at approximately one atmosphere pressure during the reaction by adding more of said gas as required. This may be done by supplying the gas from a constant pressure source. Aniline is then admitted into the tower 1 through inlet pipe 9 into receptacle 10, from which it overflows and contacts with the acid gas present as the former runs over the extensive surface provided in said tower. The tower is heated or cooled sufficiently to maintain the reaction mixture and/or final product in the molten state. The aniline flowing down over the contacting surface becomes gradually converted into aniline hydrochloride, and pure molten product runs from the bottom of tower 1, through constriction 3 into receiver 2, wherefrom the latter may be removed in either solid or liquid form. The temperature of the receiver may be controlled by suitable means to collect the product as a solid or as a liquid therein.

Preferred modes of procedure for carrying out the invention are illustrated in the following examples, but it is understood that such examples are not to be interpreted as a limitation upon the invention.

Example 1

100 grams pure aniline was dropped slowly during a period of 3 hours into tower 1 from which air had been displaced by anhydrous hydrogen chloride gas. As the latter was absorbed, it was replaced from a constant pressure source, hence the pressure in the reactor was approximately 1 atmosphere throughout the experiment. The aniline hydrochloride formed in the tower flowed into receiver 2 wherein it solidified. The yield was 133 grams, or 96 per cent theoretical, of pure white aniline hydrochloride (M. P. 198° C.).

Example 2

325 grams of pure aniline was run slowly down through vertical tower 1 in which gaseous hydrogen chloride was maintained at approximately one atmosphere pressure throughout the experiment. The tower was heated sufficiently to keep the aniline hydrochloride formed therein in the liquid state, which latter then dripped from said tower into receiver 2 wherein it solidified in the presence of hydrogen chloride. The product (M. P. 198° C.) was pure, white, crystalline, and was obtained in a substantially quantitative yield.

Example 3

Ortho-toluidine hydrobromide was prepared from 100 grams of freshly distilled ortho-toluidine and gaseous hydrogen bromide in a similar manner. The yield of pure, white, crystalline product (M. P. 202° C.) was 97 per cent theoretical.

I have also conducted my improved process in an inclined, instead of a vertical, tube into the upper end of which aniline was admitted in a continuous stream and into the lower end of which hydrochloric acid gas was admitted from a constant pressure source. The apparatus was first swept free of air by a current of anhydrous hydrogen chloride. An outlet at the lower end of the inclined tube connected with a receiver. The tube was maintained at a temperature at which the aniline hydrochloride was at all times fluid and the product running into the receiver was pure, white aniline hydrochloride. The yield was substantially quantitative and M. P. 198° C.

I do not limit my invention to the materials specifically mentioned in the examples. Other equivalent amines may be utilized, such as primary, secondary, or tertiary aliphatic amines, e. g. alkyl amines, or other aromatic amines which may or may not be substituted by groups such as alkyl, e. g. the N-substituted anilines, or the toluidines, or xylidines.

Other modes of procedure may be followed. For instance, gaseous hydrogen chloride may be circulated through the reactor in contact with the aniline, and unreacted gas recycled. The reaction may be carried out under either reduced or increased pressure, and may be adapted to continuous working. For instance, aniline and hydrogen chloride gas may be admitted continuously or intermittently into the reactor, the product being drawn off in the liquid state in any convenient manner.

Alternatively, the procedure may be as follows: gaseous hydrogen chloride may be passed over or into heated aniline at a temperature above the fusion temperature of either the resulting mixture or the product, the liquid being stirred or agitated in any suitable manner during the reaction to bring the aniline into contact with said gas. The melting point of aniline hydrochloride is 198–199° C., hence the final temperature of the reaction mixture must rise to that temperature or above. The reacted mass may be cooled in situ and removed, or may be drawn off in the liquid state to cool, the latter step being carried out in an atmosphere of gaseous hydrogen chloride or in an atmosphere free from oxygen. Such product may be reduced to any preferred size by crushing, grinding, or flaking or the like.

In the present new procedure, the handling of materials and the number of operation steps are reduced to a minimum. A hydrohalide gas is absorbed directly in an amine and a substantially pure molten product may be run into a container, hence the use of solvents or diluents is avoided and such steps as mother-liquor concentrations, crystallizations, filtrations, dryings and/or evaporations are eliminated. Fire and health hazards are reduced to a minimum and the cost of production is lowered materially.

In brief, my invention consists in directly reacting an amine in the liquid state with a gaseous hydrogen halide under substantially anhydrous conditions, and in the absence of a solvent or diluting medium, or vapors of such, thereby producing a liquid product which may then be solidified.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:—

1. The method of making an amine hydrohalide, which comprises reacting between an amine in the liquid state and a gaseous hydrogen halide in the absence of a solvent.

2. The method of making an aromatic amine hydrohalide, which comprises reacting between an aromatic amine in the liquid state and a gaseous hydrogen halide in the absence of a solvent.

3. The method of making aniline hydrochloride, which comprises reacting between aniline in the liquid state and gaseous hydrogen chloride in the absence of a solvent.

4. The method of making an amine hydrohalide, which comprises reacting between an amine in the liquid state and a gaseous hydrogen halide in the absence of a solvent and at a temperature sufficent to maintain the reaction mixture in the liquid state.

5. The method of making an aromatic amine hydrochloride, which comprises reacting between an aromatic amine in the liquid state and gaseous hydrogen chloride in the absence of a solvent and at a temperature sufficient to maintain the reaction mixture in the liquid state.

6. The method of making aniline hydrochloride, which comprises reacting between aniline in the liquid state and gaseous hydrogen chlorde in the absence of a solvent and at a temperature sufficient to maintain the reaction mixture in the liquid state.

7. The method of making an aromatic amine hydrohalide, which comprises flowing an aromatic amine in the liquid state over a surface in contact with a gaseous hydrogen halide and at a temperature sufficient to maintain the reaction mixture in the liquid state.

8. The method of making an aniline hydrohalide, which comprises flowing aniline in the liquid state over a surface in contact with a gaseous hydrogen halide and at a temperature sufficient to maintain the reaction mixture in the liquid state.

9. The method of making aniline hydrochloride, which comprises flowing aniline in the liquid state over a surface in contact with gaseous hydrogen chloride and at a temperature sufficient to maintain the reaction mixture in the liquid state.

10. The method of making an aromatic amine hydrohalide, which comprises reacting between an aromatic amine in the liquid state and a gaseous hydrogen halide, and drawing off product in the liquid state.

11. The method of making aniline hydrochloride, which comprises reacting between aniline in the liquid state and a gaseous hydrogen chloride, and drawing off product in the liquid state.

12. In a method of preparing an amine hydrohalide, the steps which consist in contacting a current of aniline in liquid phase with the gaseous hydrogen halide in countercurrent relation, and controlling the reaction temperature within the range in which the reaction mixture is liquid.

13. In a method of preparing aniline hydrochloride, the steps which consist in contacting a current of aniline in liquid phase with gaseous hydrochloric acid in countercurrent relation, and controlling the reaction temperature within the range in which the reaction mixture is liquid.

14. In a method of making aniline hydrochloride by reacting aniline with gaseous hydrogen chloride in the absence of a solvent, the steps which consist in flowing aniline in the liquid state, downward over a distributing surface, passing gaseous hydrogen chloride upward against the flow of aniline, maintaining the thereby formed aniline hydrochloride in liquid state, and removing the product from the reaction zone in liquid state.

15. The method of making an amine hydrohalide which comprises progressively reacting an amine in the liquid state and a gaseous hydrogen halide in countercurrent relation thereto, while maintaining the reaction mixture at a temperature whereat the latter remains in the liquid state and excess gaseous hydrogen halide is removed from the product.

16. The method of making an aromatic amine hydrohalide which comprises progressively reacting an aromatic amine in the liquid state and a gaseous hydrogen halide in countercurrent relation thereto, while maintaining the reaction mixture at a temperature whereat the latter remains in the liquid state and excess gaseous hydrogen halide is removed from the product.

17. The method of making an aniline hydrohalide which comprises progressively reacting aniline in the liquid state and a gaseous hydrogen halide in countercurrent relation thereto, while maintaining the reaction mixture at a temperature whereat the latter remains in the liquid state and excess gaseous hydrogen halide is removed from the product.

18. The method of making aniline hydrochloride which comprises progressively reacting aniline in the liquid state and a gaseous hydrogen chloride in countercurrent relation thereto, while maintaining the reaction mixture at a temperature whereat the latter remains in the liquid state and excess gaseous hydrogen chloride is removed from the product.

Signed by me this 11th day of September, 1929.

LINDLEY E. MILLS.